(12) United States Patent
Sanchez et al.

(10) Patent No.: US 9,303,528 B2
(45) Date of Patent: Apr. 5, 2016

(54) MID-TURBINE FRAME THERMAL RADIATION SHIELD

(75) Inventors: Paul K. Sanchez, New Britain, CT (US); Jorge I. Farah, Hartford, CT (US)

(73) Assignee: United Technologies Corporation, Hartford, CT (US)

( * ) Notice: Subject to any disclaimer, the term of this patent is extended or adjusted under 35 U.S.C. 154(b) by 831 days.

(21) Appl. No.: 13/543,243

(22) Filed: Jul. 6, 2012

(65) Prior Publication Data

US 2014/0007588 A1 Jan. 9, 2014

(51) Int. Cl.
*F01D 25/28* (2006.01)
*F01D 25/16* (2006.01)
*F01D 9/06* (2006.01)
*F01D 25/14* (2006.01)

(52) U.S. Cl.
CPC .............. *F01D 25/162* (2013.01); *F01D 9/065* (2013.01); *F01D 25/145* (2013.01); *F01D 25/28* (2013.01); *F05D 2230/54* (2013.01); *F05D 2240/15* (2013.01); *Y02T 50/675* (2013.01)

(58) Field of Classification Search
CPC .............. B64D 27/26; F02C 7/20; F23R 3/60; F01D 25/28; F01D 25/243; F01D 25/246
See application file for complete search history.

(56) References Cited

U.S. PATENT DOCUMENTS

| | | | |
|---|---|---|---|
| 4,369,016 A | 1/1983 | Dennison | |
| 4,920,742 A | 5/1990 | Nash et al. | |
| 5,273,397 A * | 12/1993 | Czachor et al. | 415/177 |
| 5,429,478 A | 7/1995 | Krizan et al. | |
| 6,511,284 B2 | 1/2003 | Darnell et al. | |
| 7,093,439 B2 | 8/2006 | Pacheco-Tougas et al. | |
| 7,229,249 B2 | 6/2007 | Durocher et al. | |
| 7,779,637 B2 | 8/2010 | Heilos | |
| 2008/0276621 A1 | 11/2008 | Somanath et al. | |
| 2009/0142182 A1 | 6/2009 | Kapustka | |
| 2010/0021286 A1 | 1/2010 | Somanath et al. | |
| 2010/0132371 A1 * | 6/2010 | Durocher et al. | 60/796 |
| 2010/0275572 A1 | 11/2010 | Durocher et al. | |
| 2011/0081237 A1 | 4/2011 | Durocher et al. | |
| 2011/0189002 A1 | 8/2011 | Panaite et al. | |
| 2011/0214433 A1 | 9/2011 | Feindel et al. | |
| 2011/0305578 A1 * | 12/2011 | Smarsly et al. | 416/223 R |

FOREIGN PATENT DOCUMENTS

DE 102009044103 A1 6/2010
GB 2207707 A 2/1989

OTHER PUBLICATIONS

The International Search Report mailed Sep. 12, 2013 for International Application No. PCT/US2013/046831.
Extended European Search Report from EP Application Serial No. 13812703.0, Dated Jun. 11, 2015, 7 pages.

* cited by examiner

*Primary Examiner* — Craig Kim
(74) *Attorney, Agent, or Firm* — Kinney & Lange, P.A.

(57) ABSTRACT

A thermal radiation shield comprises a first mounting base and a ring section. The first mounting base is disposed at a first axial end of the ring section for securing the shield ring section within a generally annular cavity defined at least in part by a hot fluid flow path boundary wall, and a radially adjacent and spaced apart cold fluid flow path boundary wall. The ring section is configured to substantially block a line of sight between the hot fluid flow path boundary wall and the cold fluid flow path boundary wall.

9 Claims, 5 Drawing Sheets

MID-TURBINE FRAME THERMAL RADIATION SHIELD

BACKGROUND

The described subject matter relates generally to gas turbine engines and more particularly, to arrangements for separating hot and cold flows in gas turbine engines.

Compact engines require closer packing of components, which in turn requires more crossing of hot and cold gas flows. Without adequate thermal protection, seals, and insulation between these flows, smaller engines suffer from a loss of efficiency. One system developed for certain engines is the mid-turbine frame (MTF), also known as the turbine center frame (TCF) or interturbine frame. This can be disposed between intermediate stages of the turbine section and can have numerous components serving a variety of functions, including as bearing support, engine backbone, combustion gas flow path, coolant flow path, among others.

Despite tight sealing of the various flows, efficiency gains expected from increased combustion temperatures are not always realized due in part to hot section components being disposed in close proximity to cold section components. As engines are made smaller, the clearances between components, including in the mid-turbine frame area also become tighter. Additional measures must therefore be taken to maintain flow separation and account for higher thermal gradients.

SUMMARY

A thermal radiation shield comprises a first mounting base and a ring section. The first mounting base is disposed at a first axial end of the ring section for securing the shield ring section within a generally annular cavity defined at least in part by a hot fluid flow path boundary wall, and a radially adjacent and spaced apart cold fluid flow path boundary wall. The ring section is configured to substantially block a line of sight between the hot fluid flow path boundary wall and the cold fluid flow path boundary wall.

A gas turbine engine mid-turbine frame (MTF) comprises a radially outer case, a radially inner case, a plurality of load spokes, a vane pack, and a thermal radiation shield. The radially outer and inner cases define an annular hot section therebetween. The plurality of load spokes extend radially through the hot section and securing the outer case with the inner case. The vane pack defines a sealed hot gas path axially traversing an annular portion of the hot section. The thermal radiation is shield secured within a generally annular hot section cavity defined outside the sealed hot gas path.

DETAILED DESCRIPTION

Figure 1:
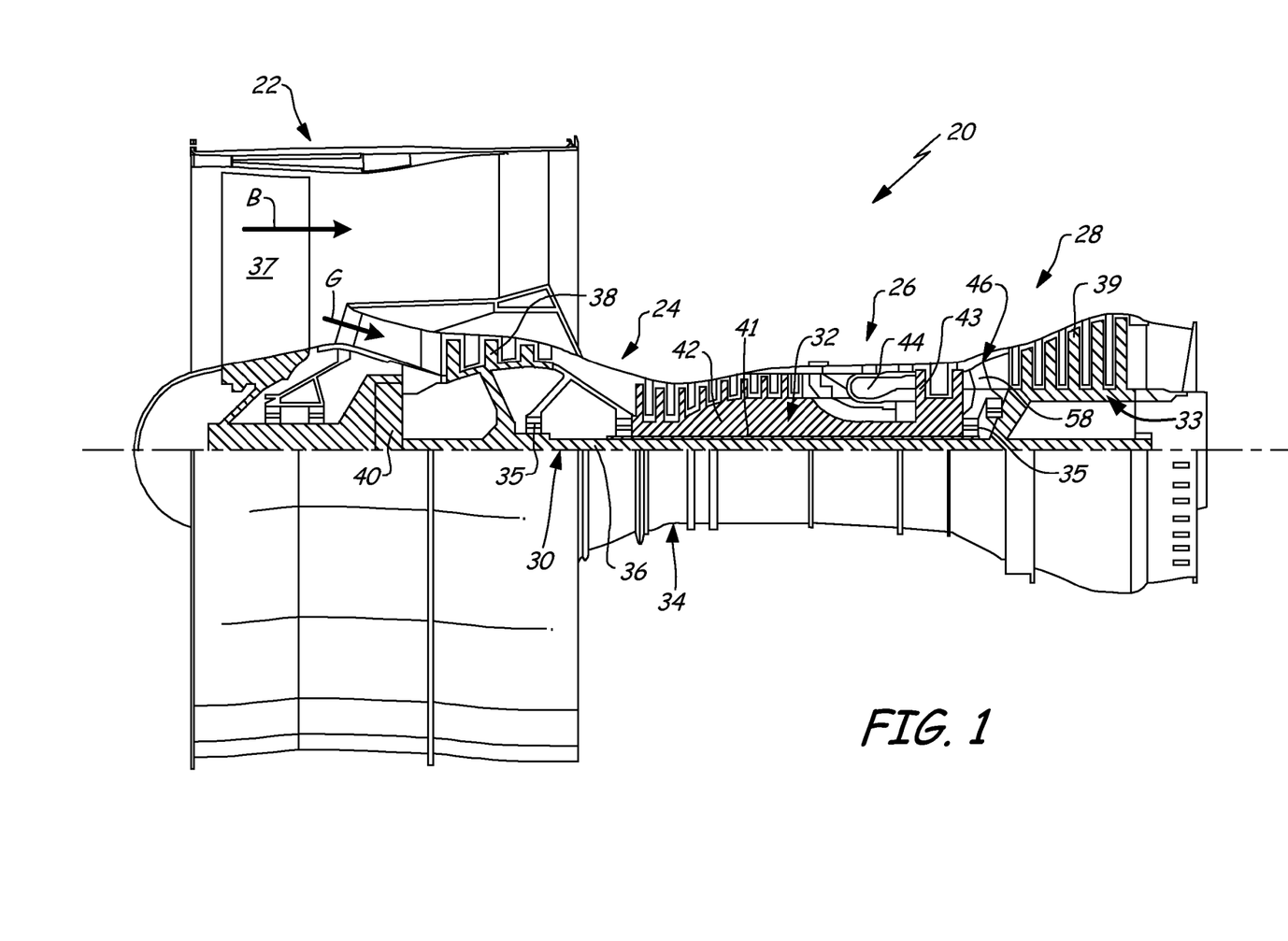
FIG. 1 is a schematic cross-sectional view of a turbofan gas turbine engine according to the present description.

FIG. 1 schematically illustrates an example gas turbine engine 20 that includes fan section 22, compressor section 24, combustor section 26 and turbine section 28. Alternative engines might include an augmenter section (not shown) among other systems or features. Fan section 22 drives air along bypass flow path B while compressor section 24 draws air in along core flow path G where air is compressed and communicated to combustor section 26. In combustor section 26, air is mixed with fuel and ignited to generate a high pressure exhaust gas stream that expands through turbine section 28 where energy is extracted and utilized to drive fan section 22 and compressor section 24.

Although the disclosed non-limiting embodiment depicts a turbofan gas turbine engine, it should be understood that the concepts described herein are not limited to use with turbofans as the teachings may be applied to other types of turbine engines; for example a turbine engine including a three-spool architecture in which three spools concentrically rotate about a common axis and where a low spool enables a low pressure turbine to drive a fan via a gearbox, an intermediate spool that enables an intermediate pressure turbine to drive a first compressor of the compressor section, and a high spool that enables a high pressure turbine to drive a high pressure compressor of the compressor section.

The example engine 20 generally includes low speed spool 30 and high speed spool 32 mounted for rotation about an engine central longitudinal axis A relative to an engine static structure 34 via several bearing systems 35. It should be understood that various bearing systems 35 at various locations may alternatively or additionally be provided.

Low speed spool 30 generally includes inner shaft 36 that connects fan 37 and low pressure (or first) compressor section 38 to low pressure (or first) turbine section 39. Inner shaft 36 drives fan 37 through a speed change device, such as geared architecture 40, to drive fan 37 at a lower speed than low speed spool 30. High-speed spool 32 includes outer shaft 41 that interconnects high pressure (or second) compressor section 42 and high pressure (or second) turbine section 43. Inner shaft 36 and outer shaft 41 are concentric and rotate via bearing systems 35 about engine central longitudinal axis A.

Combustor 44 is arranged between high pressure compressor 42 and high pressure turbine 43. In one example, high pressure turbine 43 includes at least two stages to provide a double stage high pressure turbine 43. In another example, high pressure turbine 43 includes only a single stage. As used herein, a "high pressure" compressor or turbine experiences a higher pressure than a corresponding "low pressure" compressor or turbine.

The example low pressure turbine 39 has a pressure ratio that is greater than about 5. The pressure ratio of the example low pressure turbine 39 is measured prior to an inlet of low pressure turbine 39 as related to the pressure measured at the outlet of low pressure turbine 39 prior to an exhaust nozzle.

Mid-turbine frame 46 of engine static structure 34 is arranged generally between high pressure turbine 43 and low pressure turbine 39. Mid-turbine frame 46 further supports bearing systems 35 in turbine section 28 as well as setting airflow entering low pressure turbine 39.

The core airflow G is compressed by low pressure compressor 38 then by high pressure compressor 42 mixed with fuel and ignited in combustor 44 to produce high speed exhaust gases that are then expanded through high pressure turbine 43 and low pressure turbine 46. Mid-turbine frame 46 includes vanes 58, which are in the core airflow path and function as an inlet guide vane for low pressure turbine 39. Utilizing vane 58 of mid-turbine frame 46 as the inlet guide vane for low pressure turbine 39 decreases the length of low pressure turbine 39 without increasing the axial length of mid-turbine frame 46. Reducing or eliminating the number of vanes in low pressure turbine 39 shortens the axial length of turbine section 28. Thus, the compactness of gas turbine engine 20 is increased and a higher power density may be achieved.

The disclosed gas turbine engine 20 in one example is a high-bypass geared aircraft engine. In a further example, gas turbine engine 20 includes a bypass ratio greater than about six (6), with an example embodiment being greater than about ten (10). The example geared architecture 40 is an epicyclical gear train, such as a planetary gear system, star gear system or other known gear system, with a gear reduction ratio of greater than about 2.3.

In one disclosed embodiment, gas turbine engine 20 includes a bypass ratio greater than about ten (10:1) and the fan diameter is significantly larger than an outer diameter of low pressure compressor 38. It should be understood, however, that the above parameters are only exemplary of one embodiment of a gas turbine engine including a geared architecture and that the present disclosure is applicable to other gas turbine engines.

A significant amount of thrust is provided by bypass flow B due to the high bypass ratio. Fan section 22 of engine 20 is designed for a particular flight condition—typically cruise at about 0.8 Mach and about 35,000 feet. The flight condition of 0.8 Mach and 35,000 ft., with the engine at its best fuel consumption—also known as "bucket cruise Thrust Specific Fuel Consumption ('TSFC')"—is the industry standard parameter of pound-mass (lbm) of fuel per hour being burned divided by pound-force (lbf) of thrust the engine produces at that minimum point.

"Low fan pressure ratio" is the pressure ratio across the fan blade alone, without a Fan Exit Guide Vane ("FEGV") system. The low fan pressure ratio as disclosed herein according to one non-limiting embodiment is less than about 1.50. In another non-limiting embodiment the low fan pressure ratio is less than about 1.45.

"Low corrected fan tip speed" is the actual fan tip speed in ft/sec divided by an industry standard temperature correction of $[(T_{ram}° R)/518.7)^{0.5}]$. The "Low corrected fan tip speed", as disclosed herein according to one non-limiting embodiment, is less than about 1150 ft/second.

The example gas turbine engine includes fan 37 that comprises in one non-limiting embodiment less than about 26 fan blades. In another non-limiting embodiment, fan section 22 includes less than about 20 fan blades. Moreover, in one disclosed embodiment low pressure turbine 39 includes no more than about 6 turbine rotors schematically indicated at 33. In another non-limiting example embodiment low pressure turbine 39 includes about 3 turbine rotors. A ratio between number of fan blades 37 and the number of low pressure turbine rotors is between about 3.3 and about 8.6. The example low pressure turbine 39 provides the driving power to rotate fan section 22 and therefore the relationship between the number of turbine rotors at 33 in low pressure turbine 39 and number of blades in fan section 22 disclose an example gas turbine engine 20 with increased power transfer efficiency.

Figure 2A:
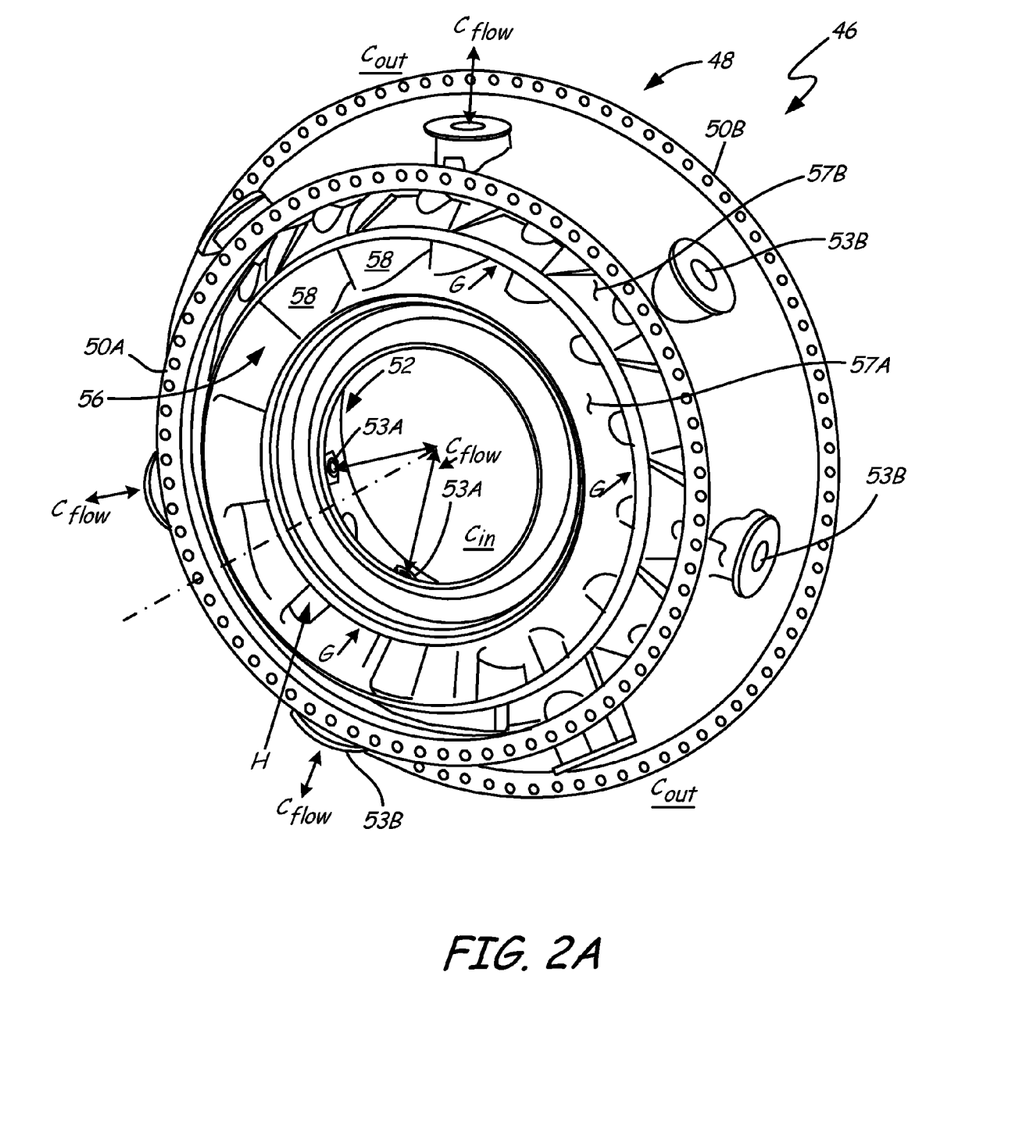
FIG. 2A shows a perspective view of an exemplary mid-turbine frame for a gas turbine engine.

FIG. 2A shows MTF 46, and includes outer case 48, outer case flanges 50A, 50B, inner case 52, inner coolant port 53A, outer coolant port 53B, vane pack 56, inner vane pack wall 57A, outer vane pack wall 57B, and vanes 58.

An example embodiment of MTF 46 has outer case 48 with axially opposed outer case flanges 50A, 50B for mounting MTF 46 to adjacent engine component cases (e.g., cases of HPT 43, LPT 39). Outer case 48 can also be radially secured to inner case 52 to define an engine support frame. In one non-limiting example, a plurality of radially extending and circumferentially distributed load spokes (not visible in FIG. 2A) structurally join outer case 48 with inner case 52.

In certain embodiments, outer case 48 forms a cold fluid flow path boundary for outer cold section $C_{out}$, located in the region radially outward of outer case 48. Similarly, inner case 52 can define a cold fluid flow path boundary wall for inner cold section $C_{in}$, located radially inward of inner case 52. Hot section H includes the annular region radially disposed between $C_{out}$ and $C_{in}$ (outer case 48 and inner case 52), extending axially through MTF 46. Cold gas path $C_{flow}$ can radially communicate coolant (e.g., compressor bleed air) between outer cold section $C_{out}$ and inner cold section $C_{in}$, via respective inner coolant ports 53A and outer coolant ports 53B. Inner cold section $C_{in}$ may be further delineated around inner case 52 by various shafts, bearings, and ducts which are retained by or within inner case 52. These and other arrangements have been omitted in favor of more clearly showing elements of MTF 46.

Sealed core flow gas flow path G can occupy an annular portion of hot section H to direct combustion gas products axially through MTF 46. Here path G is defined generally between respective radially inner and outer walls 57A, 57B and around vanes 58. Inner wall 57A of vane pack 56 can define an inner hot fluid flow path boundary wall for core flow gas path G and is spaced apart from inner case 52 serving as a cold fluid flow path boundary wall for inner cold section $C_{in}$. Similarly, outer wall 57B defines an outer hot fluid flow path boundary wall spaced apart from outer case 48 serving as a cold fluid flow path boundary wall for outer cold section $C_{out}$. As will be seen below, depending on the configuration of vane pack 56, there can be at least one of an inner or outer generally annular hot section cavity disposed in hot section H outside the boundary wall of the core flow gas path G between a hot fluid flow path boundary wall (inner and/or outer vane pack walls 57A, 57B) and an adjacent cold fluid flow path boundary wall (inner case 52 and/or outer case 48).

In the example of FIG. 1, vane pack 56 operates as a first stage inlet stator for LPT 39. MTF 46 can be alternatively arranged between other pairs of adjacent turbine stages. Vane pack 56 is shown here as having vanes 58 integrally formed monolithic inner and outer walls 57A, 57B. In certain embodiments, vanes 58 may be removably secured to one or both walls. Inner and outer walls 57A, 57B may alternatively be segmented into integral vane singlets, doublets, or other suitable arrangements of one or more vanes 58. In embodiments with one or both inner and outer walls 57A, 57B being segmented, the segments may be joined together such as by brazing, welding, or other semi-permanent metal-joining processes to form the core flow path boundary. Circumferentially distributed seal elements may also be used to supplement or replace the semi-permanent joints and reduce leakage.

Despite being sealed and radially spaced apart from inner case 52, inner vane pack wall 57A emits substantial thermal radiation during engine operation. A thermal radiation shield, examples of which are described below, can be disposed in a generally annular inner hot section cavity between inner wall 57A and inner case 52 to reflect this radiation away from inner case 52. It will be appreciated that an arrangement similar to that described below may readily be adapted for thermal radiation emitted from outer vane pack wall 57B through an outer annular hot section cavity toward outer case 48.

Figure 2B:
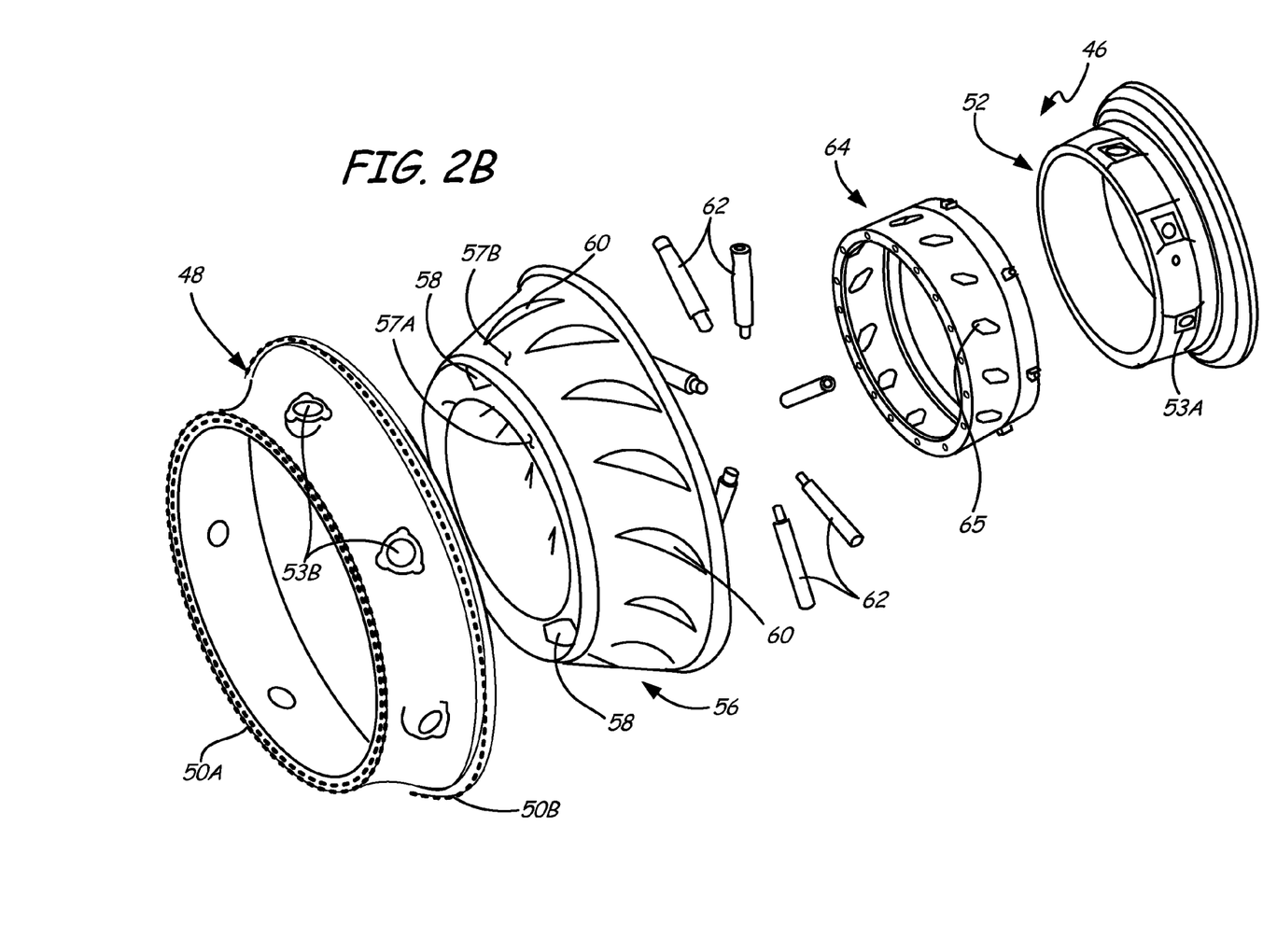
FIG. 2B shows an exploded view of certain components of the mid-turbine frame depicted in FIG. 2A.

FIG. 2B is an exploded view of MTF 46, including outer case 48, outer case flanges 50A, 50B, inner case 52, vane pack 56, inner vane pack wall 57A, outer vane pack wall 57B, stator vanes 58, vane internal passages 60, spokes 62, thermal radiation shield 64, and first outer circumferential shield surface 65.

The components shown in the exploded view of MTF 46 generally fit axially together in the order shown in FIG. 2B, with the exception of the plurality of radially extending and circumferentially distributed load spokes 62. Spokes 62 radially secure outer case 48 with inner case 52. In certain embodiments, load spokes 62 are structural while also providing a radial flow path $C_{flow}$ between inner and outer cold sections $C_{in}$, $C_{out}$. For compactness and improved efficiency of engine 10, spokes 62 can be retained in some or all of passages 60 disposed radially through individual vanes 58. In this example, there are seven load spokes 62 extending through alternating ones of fourteen vanes 58 via respective vane internal passages 60. However, the number and arrangement of vanes 58 and spokes 62 will vary based on individual considerations, including but not limited to thermal and structural loads.

Smaller to mid-size engines utilizing various embodiments of a mid-turbine frame will often have limited clearance between hot and cold section components, which increases thermal conflict between hot and cold gas flows. In this example, to reduce the thermal conflict, thermal radiation shield 64 with first outer circumferential surface 65 is disposed between vane pack 56 and inner case 52. First outer surface 65 faces inner vane pack wall 57A to reflect a portion of emitted thermal radiation back toward vane pack 56 and away from inner case 52. An opposing inner circumferential surface (not shown) of shield 64, which may or may not be reflective, can face an adjacent boundary wall of cold section (inner case 52). It will be recognized that certain embodiments of shield 64 can be adapted for an outer annular hot section cavity between an outer hot gas path boundary wall (e.g., outer vane pack wall 57B) and an outer cold gas path boundary wall (e.g., outer case 48). In such embodiments, first circumferential surface 65 would be the inner circumferential surface which faces the hot gas path boundary wall.

Figure 2C:
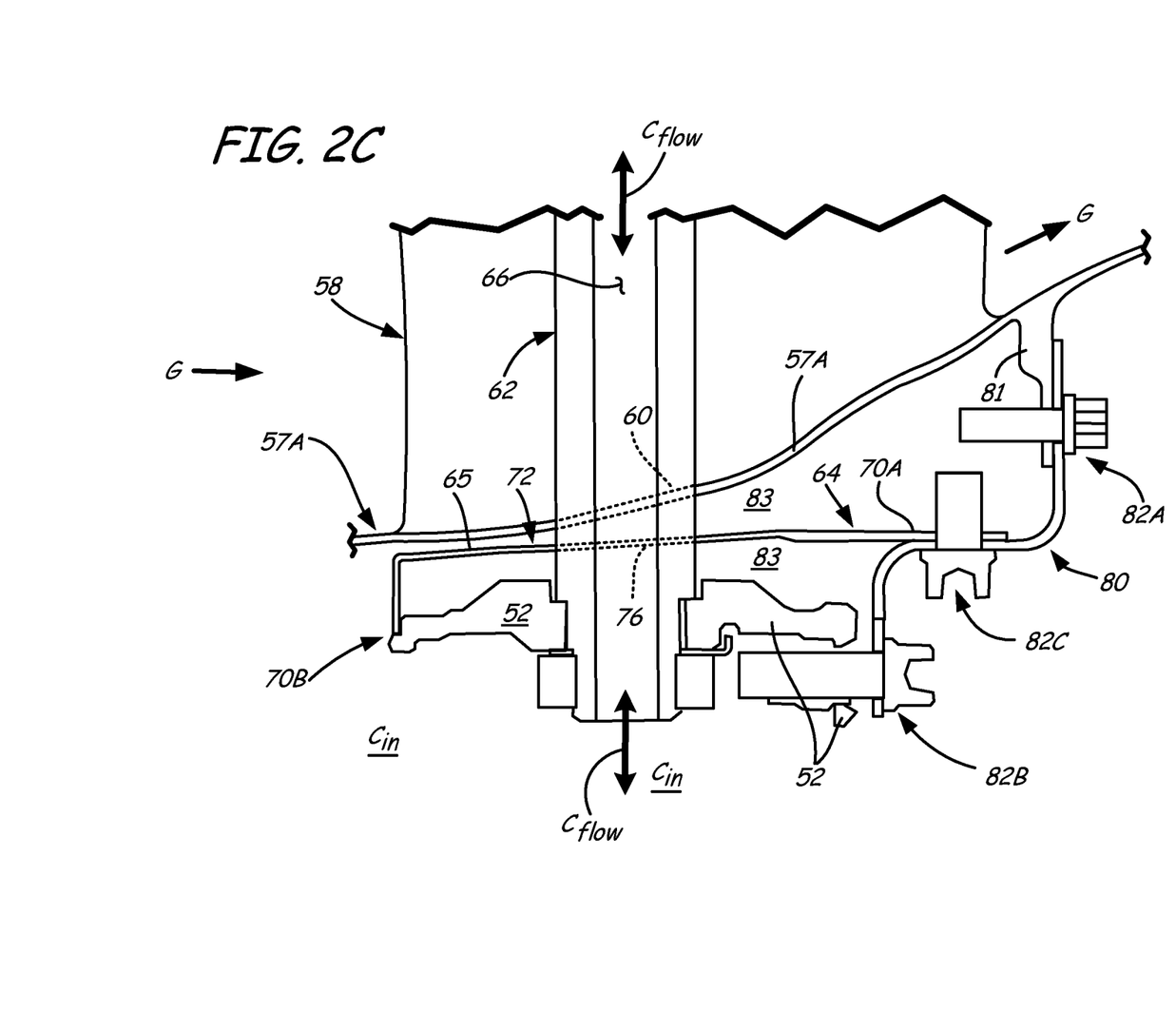
FIG. 2C is a partially cut away cross-sectional view of the mid-turbine frame of FIG. 2A.

FIG. 2C shows inner case 52, inner vane pack wall 57A, stator vane 58, vane internal passage 60, load spoke 62, thermal radiation shield 64, shield reflective surface 65, spoke bore 66, shield mounting base 70A, forward shield mounting base 70B, shield ring section 72, shield aperture 76, LPT shield 80, aft vane flange 81, aft seal mounts 82A, 82B, 82C, and inner annular hot section cavity 83.

FIG. 2C shows one illustrative example of thermal radiation shield 64 secured relative to an overall MTF convective sealing arrangement. One or more spokes 62 can include bore 66 defining radial cooling air flow path ($C_{flow}$) between inner and outer cold sections $C_{in}$, $C_{out}$. The forward end of inner case 52 can optionally be sealed to inner vane pack wall 57A proximate HPT 43 by any suitable means (not shown) Thermal radiation shield 64 does not provide convective sealing between components defining either core flow gas path G or generally annular hot section H. Rather, convective sealing may be provided by additional or alternative seals, such as by compressive seals (not shown) disposed in gaps between and around inner case 52 and/or vane pack 56.

At the aft (LPT) end of inner case 52, LPT rotor shield 80 includes first mount 82A securing an upper portion of LPT rotor shield 80 to aft vane flange 81 extending radially inward from inner vane pack wall 57A. Second mount 82B joins a lower portion of LPT rotor shield 80 to an aft flange (not numbered) on inner case 52. In this example, thermal radiation shield 64 is secured to LPT rotor shield 80 at third mount 82C.

In one example, mounting base 70A at a first axial end of shield 64 includes an aft flange and/or bosses (not numbered in FIG. 2C) cooperating with third shield mount 82C. However, it will be appreciated that the mounting arrangement can readily be adapted to particular load and thermal constraints of a particular installation. In certain embodiments, shield 64 optionally includes second forward mounting base 70B at a second axial opposing end of ring section 72. One or both of mounting base 70A and/or 70B can be configured to secure shield 64 to a corresponding mounting surface of inner case 52. For example, one of first or second mounting base 70A, 70B can be configured for securing to a flange or other connector on inner case 52. In the event only one mounting base 70A, 70B is needed to mount shield 64 inside cavity 83, the opposing axial surface is free to thermally expand and contract proximate inner case 52. These example arrangements still allow at least part of ring section 72 to be disposed within inner annular hot section cavity 83, and substantially block the line of sight between inner vane pack wall 57A and inner case 52.

In this example, hot section cavity 83 is generally annular and disposed annularly inward of vane pack 56 and thus not occupied by gas path G. Here, cavity 83 is defined in part by inner vane pack wall 57A and inner case 52. Though annular cavity 83 is part of hot section H, flow in core flow gas path G is isolated from cavity 83, save for a small degree of seal and joint leakage around vane pack 56. Since thermal radiation from a body (such as inner wall 57A) increases to the fourth power relative to its temperature, it will be appreciated that as the combustion temperature increases, so too does the thermal radiation being emitted from inner wall 57A. For example, a 10% increase in temperature of a body (e.g., inner wall 57A) can result in almost a 50% increase in thermal energy radiating from the body toward spaced apart inner case 52. In smaller engines, inner wall 57A becomes closer to, and more in the line of sight of, inner case 52, which increases its exposure to thermal radiation, and resultant radiant heating of cold section $C_{in}$.

In larger engines, there is more clearance for separating hot and cold gas paths. Separate sheet metal ducts have in some instances been used to simultaneously seal the core flow gas path and to reflect blackbody radiation from internally disposed vanes back into the core flow gas flow path. However, these previous sheet metal ducts serving as the only core flow gas flow boundary are suitable for use only at relatively low combustion temperatures. To increase combustion gas temperatures in these thinner ducts, the hot gas flow boundary has been impingement cooled via cooling holes formed in the boundary of the adjacent inner or outer cold section (e.g., inner case 52 and/or outer case 48). However, this increases overall cooling air requirements, offsetting a large portion of the potential efficiency gains from higher operating temperatures.

In contrast, a separate radiation shield (e.g. shield 64) allows the use of a thicker, more robust and more thermally resistant vane pack 56, which can also therefore be placed in closer proximity to inner case 52. With its inner boundary more closely spaced from inner cold section $C_{in}$, core flow gas path G can operate at higher temperatures while reducing thermally induced fatigue of inner case 52. Further, inner case 52 need not utilize cooling holes to impingement cool the core flow gas duct, which reduces overall cooling requirements.

In addition, a separate shield can also preferentially control thermal growth of one or both of inner case 52 and outer case 48, which in turn can improve control of the radial thermal profile and resulting load bearing capabilities through spokes 62. Radial support loads through spokes 62 can be either tension or compression loads, for example, to support a shaft bearing assembly (not shown) within inner case 52. The magnitude of these support loads can change in part based on differing thermal expansion rates of the cases.

In certain embodiments of MTF 46, load spokes 62 are preloaded in tension during assembly to ensure the bearing assembly is supported at all times over virtually any operational scenario. In certain of these embodiments, shield 64 is disposed in the inner hot section cavity 83 to lower the temperature of a cold fluid flow path boundary wall (e.g., inner case 52 or outer case 48) by blocking the line of sight between that wall and an adjacent hot fluid flow path boundary wall (e.g., inner vane pack wall 57A). This slows thermal growth of inner case 52 that would otherwise occur without shield 64. In yet certain of these embodiments, there is no heat shield in an outer annular hot section cavity (not numbered) between outer vane pack wall 57B and outer case 48. By including shield 64 in annular cavity 83, while omitting a shield at the outer hot section cavity, outer case 48 is free to thermally expand more quickly as compared to inner case 52. This arrangement can more quickly increase tension loads through load spokes 62 sooner in the operational cycle. By adding operational tension loads more quickly to spokes 62, it can reduce the required magnitude of the preload.

Figure 3A:
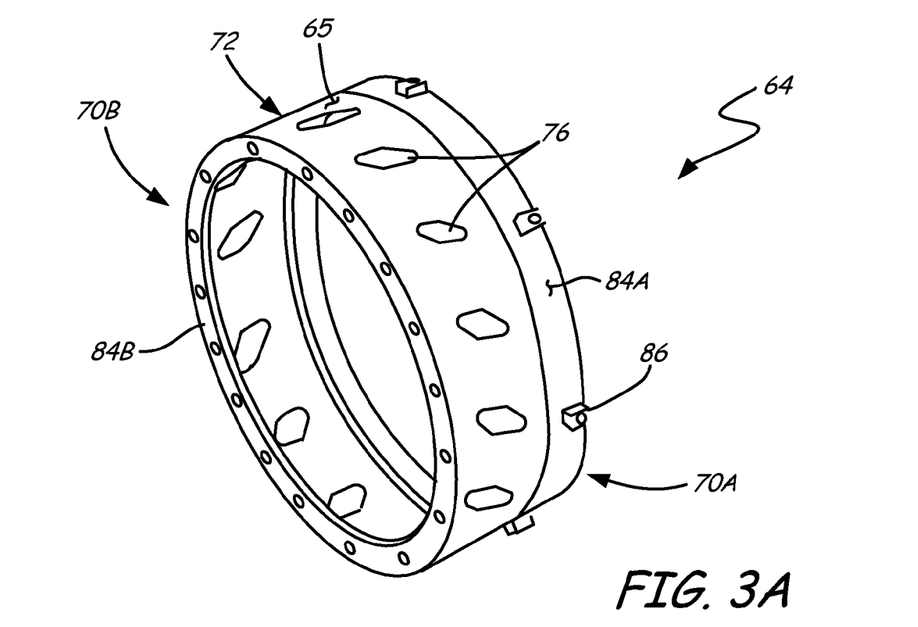
FIG. 3A is a perspective view of an example embodiment of a mid-turbine frame thermal radiation shield.

FIG. 3A isometrically depicts one example embodiment of thermal radiation shield 64, and includes shield reflective surface 65, aft shield mounting base 70A, forward shield mounting base 70B, shield ring section 72, shield apertures 76, aft shield flange 84A, forward shield flange 84B, and aft shield bosses 86.

FIG. 3A isometrically depicts thermal radiation shield 64 with first aft mounting base 70A and second forward mounting base 70B with ring section 72 disposed therebetween. Ring section 72 may be a monolithic sheet metal ring that is machined or otherwise processed to have at least one cylindrical or frustoconical ring portion with a circular cross-section. Surface 65, can be further processed if desired, such as by surface cleaning, polishing, etc., to further enhance its reflective properties.

First mounting base 70A may include first aft flange 84A at an aft end of ring section 72 for securing shield 164 to a corresponding aft component mounting surface. Optional second mounting base 70B can be disposed at a forward end of ring section 72 and may include second forward flange 84B. One or both flanges 84A, 84B may be configured to mate with corresponding component flanges or similar component mounting surfaces. In one illustrative but non-limiting example, first aft shield flange 84A is fastened to a downstream structure (e.g. LPT rotor shield shown in FIG. 2C), while second forward shield flange 84B extends radially inward from ring section 72 for mounting the forward end of shield 64 to either a portion of MTF 46, or to an optional separate HPT seal assembly (not shown) disposed forward of inner case 52. In other embodiments, both first aft mounting base 70A and second forward mounting base 70B are secured to respective aft and forward portions of inner case 52.

As noted above, shield 64 is shown in this example as being mounted to a rotor shield, but can additionally or alternatively be mounted via one or more rings 70A, 70B directly to complementary mounting surface(s) on inner case 52. It will also be appreciated that in certain alternative embodiments, shield 64 may additionally include a second ring section (not shown) in addition to ring section 72, which extend generally axially from single mounting base 70A, which results in single mounting base 70A being disposed proximate an axial midpoint of shield 64. In such alternative embodiments, base 70A can secure shield 64 to inner case 52 with both forward and aft ends of shield 64 free to thermally expand and contract as described herein.

One or both flanges 84A, 84B may be radial flanges or may be angled relative to ring section 72. For example, aft flange portion 84A may have a frustoconical or radial mounting surface depending on the exact orientation of its complementary mounting surface. Shield bosses 86 can optionally be provided to secure aft flange 84A to the selected complementary mounting surface. Forward shield flange 84B may also have a frustoconical or radial mounting surface complementary to an intended mounting surface. Forward shield flange 84B can be secured to the intended mounting surface or alternatively can be left free to contact the mounting surface without fasteners in order to allow for thermal expansion and contraction. Shield ring section 72 can also include at least one aperture 76 to accommodate elements of inner case 52 and/or vane pack 56. In some examples, there may be more or larger apertures 76 than are required for individual elements. For instance, in example MTF 46 shown in FIGS. 2A and 2B, there are a total of fourteen circumferentially distributed vanes 58, seven of which include a spoke 62 disposed through alternating vane passages 60. The correspondingly distributed fourteen apertures 76 can in certain embodiments be formed with equal cross-sectional shapes to accommodate both vane passages 60 and load spokes 62 to reduce manufacturing costs. It will be appreciated that apertures 76 may alternatively be sized to accommodate individually located elements, for example, to ensure correct assembly. Other arrangements may be used to accommodate different MTF configurations.

Figure 3B:
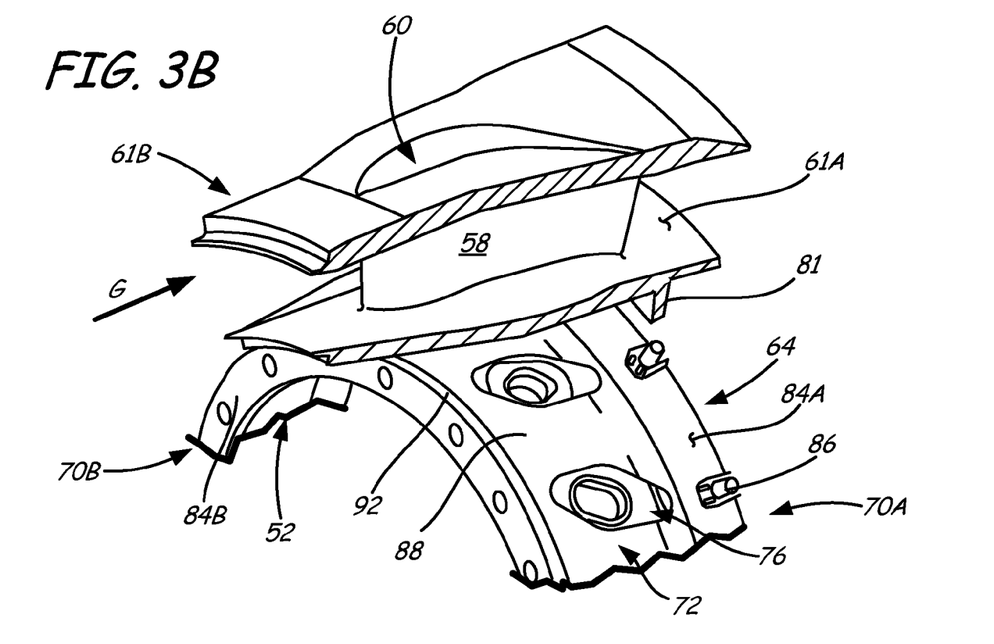
FIG. 3B isometrically shows the example mid-turbine frame thermal radiation shield disposed between an inner case and a portion of a vane ring.

FIG. 3B depicts an isometric view of thermal radiation shield 64 disposed between vane ring 56 and inner case 52. FIG. 3B also includes vane 58, vane inner passage 60, inner and outer vane pack wall portions 61A, 61B, aft mounting ring 70A, forward mounting ring 70B, shield apertures 76, aft vane flange 81, aft shield flange 84A, forward shield flange 84B, and aft bosses 86.

A portion of vane pack 56 is broken away to illustrate the relationship of inner wall 57A to ring section 72. Inner and outer vane pack wall portions 61A, 61B are broken away portions of respective inner and outer vane pack walls 57A, 57B (shown in FIGS. 2A and 2B). As noted above, one or both inner and outer vane pack walls 57A, 57B may be segmented and such a segment may take the place of the respective broken wall portions 61A, 61B.

Shield 64, including at least ring section 72, can be formed from a metallic alloy sheet. In certain embodiments, the alloy can be a similar or identical alloy composition as is used for outer case 48. The metal sheet for may be a high temperature nickel alloy. One example of a suitable class of nickel alloys for ring section 72 includes austenitic nickel alloys containing between about 20 wt % and about 23 wt % of chromium, between about 8 wt % and about 10 wt % molybdenum, and between about 3 wt % and about 4 wt % of niobium. An example alloy with this or a similar compositional range is available commercially as Inconel® 625 and its equivalents. The alloy may be processed according to the requirements of AMS 5599, which generally requires annealing above a temperature of about 1800° F. (about 975° C.). Heat treated versions of this and similar alloys are also available from numerous commercial suppliers. This and similar alloys offer corrosion and thermal resistance allowing shield 64 to better withstand the thermal radiation emitted from vane pack wall 57A. The example alloys can also have improved strength and fatigue resistant properties over other nickel alloys based on the addition of the of niobium and/or molybdenum to the nickel-chromium phase.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

Discussion of Possible Embodiments

The following are non-exclusive descriptions of possible embodiments of the present invention.

A thermal radiation shield comprises a first mounting base and a ring section. The first mounting base is disposed at a first axial end of the ring section for securing the shield ring section within a generally annular cavity defined at least in part by a hot fluid flow path boundary wall, and a radially adjacent and spaced apart cold fluid flow path boundary wall. The ring section is configured to substantially block a line of sight between the hot fluid flow path boundary wall and the cold fluid flow path boundary wall.

The apparatus of the preceding paragraph can optionally include, additionally and/or alternatively, any one or more of the following features, configurations and/or additional components:

A thermal radiation shield according to an exemplary embodiment of this disclosure includes, among other possible things, a first mounting base and a ring section. The first mounting base is disposed at a first axial end of the ring section for securing the shield ring section within a generally annular cavity defined at least in part by a hot fluid flow path boundary wall, and a radially adjacent and spaced apart cold fluid flow path boundary wall. The ring section is configured to substantially block a line of sight between the hot fluid flow path boundary wall and the cold fluid flow path boundary wall.

A further embodiment of the foregoing shield, wherein the hot flow path boundary wall additionally and/or alternatively comprises a radially inner wall of a vane pack defining an axial combustion gas path through a mid-turbine frame.

A further embodiment of any of the foregoing shields, wherein the cold flow path boundary wall additionally and/or alternatively comprises an inner case of a mid-turbine frame. A further embodiment of any of the foregoing shields, wherein the first mounting base additionally and/or alternatively comprises a first flange and a plurality of bosses circumferentially distributed around the first flange. A further embodiment of any of the foregoing shields, wherein the ring section is additionally and/or alternatively formed using a high temperature nickel alloy sheet comprising at least about 20 wt % of chromium. A further embodiment of any of the foregoing shields, wherein the high temperature nickel alloy sheet additionally and/or alternatively comprises from about 8 wt % to about 10 wt % molybdenum. A further embodiment of any of the foregoing shields, wherein the high temperature nickel alloy sheet additionally and/or alternatively comprises from about 3 wt % and about 4 wt % of niobium. A further embodiment of any of the foregoing shields, wherein the ring section additionally and/or alternatively includes a plurality of apertures through the ring section for passing a corresponding plurality of load spokes radially between the cold gas path boundary wall and the hot gas path boundary wall. A further embodiment of any of the foregoing shields, wherein the plurality of apertures additionally and/or alternatively are circumferentially distributed equally around the ring section, each aperture including a substantially identical cross-sectional shape. A further embodiment of any of the foregoing shields, wherein additionally and/or alternatively, the shield further comprises a second mounting base disposed at a second opposing axial end of the ring section.

A gas turbine engine mid-turbine frame (MTF) comprises a radially outer case, a radially inner case, a plurality of load spokes, a vane pack, and a thermal radiation shield. The radially outer and inner cases define an annular hot section therebetween. The plurality of load spokes extend radially through the hot section and securing the outer case with the inner case. The vane pack defines a sealed hot gas path axially traversing an annular portion of the hot section. The thermal radiation is shield secured within a generally annular hot section cavity defined outside the sealed hot gas path.

The apparatus of the preceding paragraph can optionally include, additionally and/or alternatively, any one or more of the following features, configurations and/or additional components:

A gas turbine engine mid-turbine frame according to an exemplary embodiment of this disclosure includes, among other possible things, a radially outer case, a radially inner case, a plurality of load spokes, a vane pack, and a thermal radiation shield. The radially outer and inner cases define an annular hot section therebetween. The plurality of load spokes extend radially through the hot section and securing the outer case with the inner case. The vane pack defines a sealed hot gas path axially traversing an annular portion of the hot section. The thermal radiation is shield secured within a generally annular hot section cavity defined outside the sealed hot gas path.

A further embodiment of the foregoing mid-turbine frame, wherein the thermal radiation shield additionally and/or alternatively includes a first mounting base disposed at a first axial end of the ring section for securing the shield ring section within the generally annular hot section cavity to substantially block a line of sight between a vane pack boundary wall and either the inner case or the outer case.

A further embodiment of any of the foregoing mid-turbine frames, wherein the first mounting base additionally and/or alternatively comprises a first flange. A further embodiment of any of the foregoing mid-turbine frames, wherein the first flange is additionally and/or alternatively secured to a downstream turbine support shield. A further embodiment of any of the foregoing mid-turbine frames, wherein the first flange is additionally and/or alternatively secured to the inner case. A further embodiment of any of the foregoing mid-turbine frames, wherein the thermal radiation shield additionally and/or alternatively further comprises a second mounting base disposed at a second opposing axial end of the ring section. A further embodiment of any of the foregoing mid-turbine frames, wherein the second mounting base additionally and/or alternatively includes a second flange secured to the inner case. A further embodiment of any of the foregoing mid-turbine frames, wherein the second mounting base additionally and/or alternatively includes a second flange free to thermally expand and contract proximate the inner case. A further embodiment of any of the foregoing mid-turbine frames, wherein the plurality of load spokes additionally and/or alternatively extend radially through a corresponding plurality of apertures in the ring section. A further embodiment of any of the foregoing mid-turbine frames, wherein the ring section is additionally and/or alternatively formed using a high temperature nickel alloy sheet comprising at least about 20 wt % of chromium.

The invention claimed is:
1. A mid-turbine frame for a gas turbine engine, the mid-turbine frame comprising:

a radially outer case bounding an outer cold section outward of the outer case;

a radially inner case bounding an inner cold section inward of the inner case, the radially outer and inner cases defining an annular hot section therebetween;

a plurality of load spokes extending radially through the hot section and securing the outer case with the inner case;

a vane pack defining a sealed hot gas path axially traversing an annular portion of the hot section; and a thermal radiation shield secured within a generally annular hot section cavity defined outside the sealed hot gas path, the thermal radiation shield including a first mounting base disposed at a first axial end of a shield ring section having at least one ring portion, the first mounting base secured to an aft component mounting surface, such that the shield ring section axially extends from the first mounting base towards a second opposing axial end of the shield ring section within the generally annular hot section cavity, the shield ring section substantially blocking a line of sight between an inner vane pack boundary wall and the inner case;

wherein the thermal radiation shield further comprises a second mounting base disposed at a second opposing axial end of the shield ring section; and wherein the second mounting base includes a second flange in contact with the inner case.

2. The mid-turbine frame of claim 1, wherein the first mounting base comprises a first flange.

3. The mid-turbine frame of claim 2, wherein the first flange is secured to a downstream turbine rotor shield.

4. The mid-turbine frame of claim 2, wherein the first flange is secured to the inner case.

5. The mid-turbine frame of claim 1, wherein the second mounting base is free to thermally expand and contract proximate the inner case.

6. The mid-turbine frame of claim 1, wherein the plurality of load spokes extend radially through a corresponding plurality of apertures in the shield ring section.

7. The mid-turbine frame of claim 1, wherein the shield ring section is formed using a high temperature nickel alloy sheet comprising at least about 20 wt % of chromium.

8. The mid-turbine frame of claim 1, wherein the aft component mounting surface is selected from: a portion of the inner case, and a downstream turbine rotor shield.

9. The mid-turbine frame of claim 1, wherein the second mounting base secures the thermal radiation shield to the inner case.

* * * * *